US005786090A

United States Patent [19]

Fisher et al.

[11] Patent Number: 5,786,090

[45] Date of Patent: Jul. 28, 1998

[54] LASER IMAGEABLE THIN FILM STRUCTURE AND PRINTING PLATE INCORPORATING THE SAME

[75] Inventors: Shari Powell Fisher; Roger W. Phillips, both of Santa Rosa; Gregory F. Davis, Guerneville; Charlotte LeGallee, Healdsburg, all of Calif.

[73] Assignee: Flex Products, Inc., Santa Rosa, Calif.

[21] Appl. No.: 608,646

[22] Filed: Feb. 29, 1996

[51] Int. Cl.⁶ .......................................... B32B 9/04
[52] U.S. Cl. .................... 428/411.1; 428/457; 428/610; 428/615; 428/620; 428/641; 101/454
[58] Field of Search ........................ 428/610, 195, 428/411.1, 457, 209, 615, 620, 641; 101/454

[56] References Cited

U.S. PATENT DOCUMENTS

| | | | |
|---|---|---|---|
| 4,492,740 | 1/1985 | Yamamoto et al. | 428/629 |
| 5,339,737 | 8/1994 | Lewis et al. | 101/454 |
| 5,379,698 | 1/1995 | Nowak et al. | 101/454 |
| 5,487,338 | 1/1996 | Lewis et al. | 101/454 |
| 5,570,636 | 11/1996 | Lewis | 101/454 |
| 5,691,063 | 11/1997 | Davis et al. | 428/411.1 |

*Primary Examiner*—Elizabeth Evans
*Attorney, Agent, or Firm*—Flehr Hohbach Test Albritton & Herbert LLP

[57] ABSTRACT

A lithographic laser imageable thin film structure comprising a substrate having first and second surfaces. A vacuum-deposited metal layer is carried by the first surface of the substrate. A layer of semiconductor material is adhered to and overlies the metal layer. The metal layer and the semiconductor material have thicknesses which are selected to maximize absorption of laser energy impinging on the same.

19 Claims, 1 Drawing Sheet

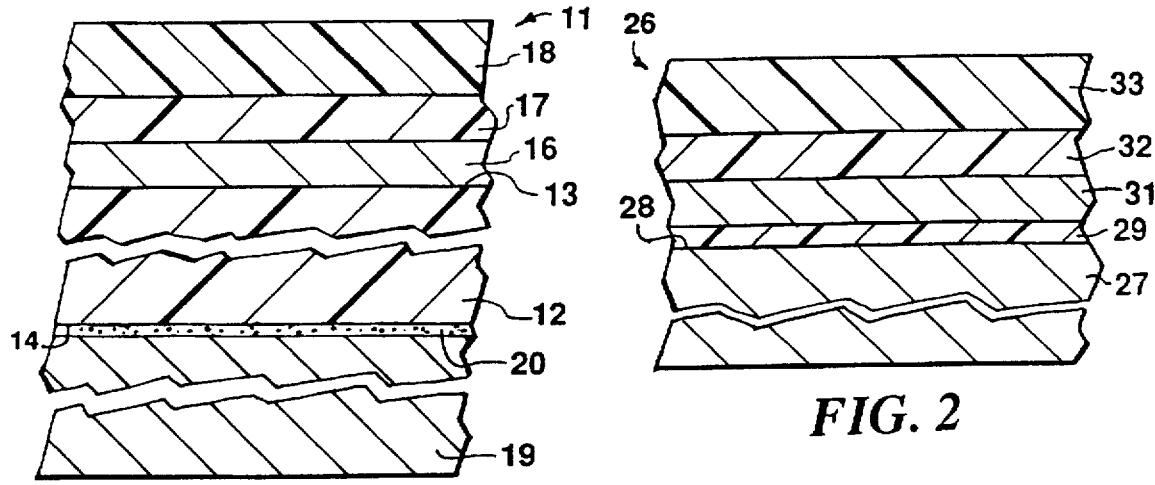
FIG. 1
FIG. 2
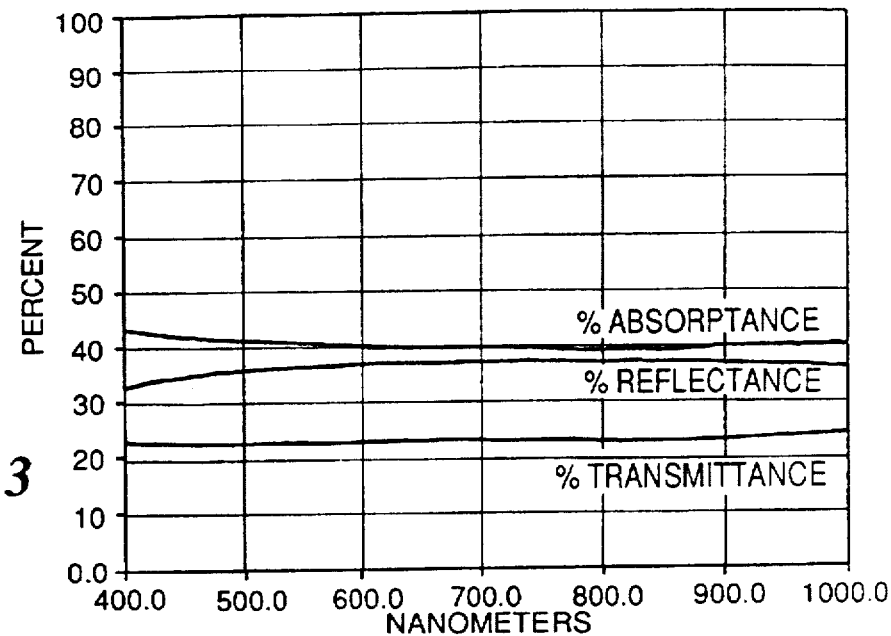
FIG. 3
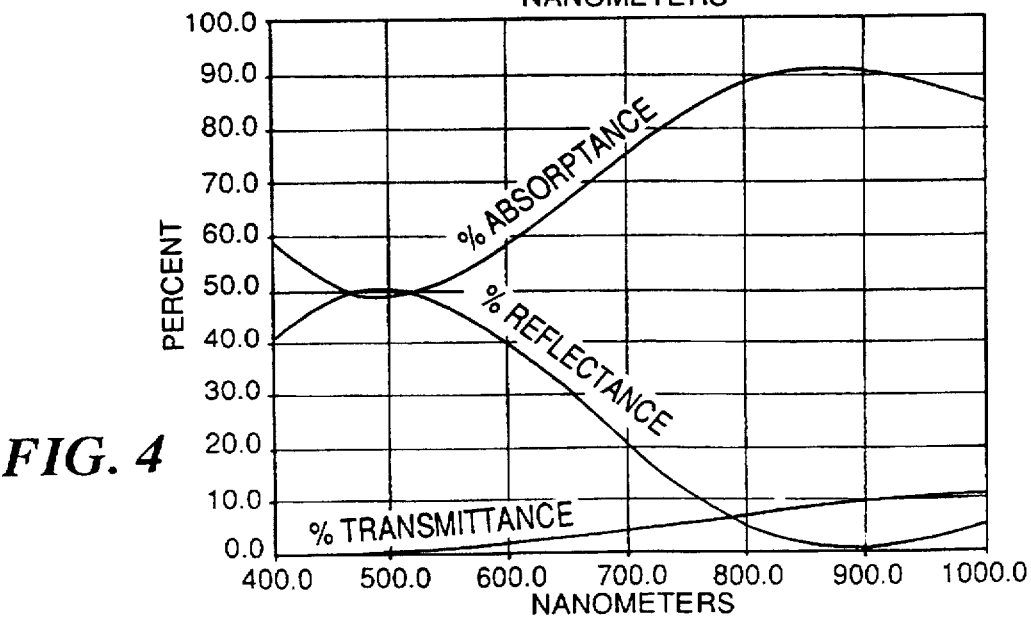
FIG. 4

LASER IMAGEABLE THIN FILM STRUCTURE AND PRINTING PLATE INCORPORATING THE SAME

This invention relates to a laser imageable thin film structure and printing plate incorporating the same, that has improved writing characteristics using digitized laser radiation.

The traditional printing method of offset lithography is undergoing rapid technological change. The change began when desktop publishing software became commonly used for the graphical layout of printing jobs. Once printers began to receive a majority of their jobs in the form of digital data instead of traditional hardcopy, they began to purchase equipment that could also utilize digital information. This new equipment helped to increase the speed and efficiency of the overall printing process. The new equipment has also significantly reduced the volume of chemical solutions used by the printing industry thereby benefitting the environment. Digital equipment heretofore provided used proofing systems that enabled customers to quickly review a digitally generated hardcopy example before the final printing phase. While digital proofing is still used today, it is increasingly common to proof directly on the computer screen and then proceed to the final printed output produced by a digitally produced printing plate. Recent technologies enable the fabrication of a printing plate directly from the original digital data by using a stand alone plate-making system. To further simplify and improve the printing process, certain new press designs allowed the plate material to be digitally imaged in situ on the printing press itself. Unfortunately the use of these innovative new presses has been limited by existing plate materials.

Digitally imaged printing plates heretofore provided utilize a single metal layer to absorb incident laser energy and ablate the plate's surface. When infrared laser energy is incident on the coated surface of the printing plate, the energy is absorbed in the metal layer causing interfacial degradation. Post-image cleaning of the plate material then removes the top coating from the irradiated area, creating a plate suitable for lithographic printing. The amount of laser energy available for the ablation process depends on the parameters of the diode laser and imaging optics. These specifications, including the pulse length, power level, and spot size, are parameters that are typically set during the initial design of the system. Since these are fixed parameters, meaningful improvements in the fabrication of laser imaged printing plates require significant hardware changes as well as difficult hardware retrofits in the field.

The response of the laser-imaged plate material directly correlates to the energy density of the laser beam. This density reaches a maximum at the beam waist where the laser spot size is the smallest. Moving the plate material to either side of the beam waist decreases the energy density of the laser beam because the beam is now out of focus and the spot size is increased. The operable range, or sensitivity, of a laser imageable plate making system can be defined as the distance over which there is sufficient energy in the laser irradiance to enable the successful imaging of a printing plate. Small but significant variations in the distance between the laser lens and the imaged plate material are caused by slight imperfections in the supporting surface for the printing plate. Therefore, if image quality is to be maintained, the system should be capable of tolerating variations in the distance between the laser lens and the image plane which currently is limited to 3–4 mils. This requires exact alignment and precise machining of the mechanical components supporting the components used in imaging the plate. There is therefore a need for increasing the tolerance range.

In general, it is an object of the present invention to provide a laser imageable thin film structure and printing plate which have improved absorption and greater operating range tolerances.

Another object of the invention is to provide a structure and printing member of the above character which makes more efficient use of incident radiation from an infrared diode laser.

Additional objects and features of the invention will appear from the following description in which preferred embodiments are set forth in detail in conjunction with the accompanying drawings.

FIG. 1 is a cross sectional view of a laser imageable thin film structure and a printing plate incorporating the same which utilize the present invention.

FIG. 2 is a cross-sectional view of another embodiment of a printing plate incorporating the present invention.

FIG. 3 is a graph showing the optical performance of a single metal layer of titanium where its thickness has been adjusted for maximum absorption at the infrared diode laser wavelength.

FIG. 4 is a graph showing the improved absorption which can be achieved with the printing plate shown in FIG. 1.

In general, the laser imageable thin film structure for use with a laser producing radiation at a near-infrared wavelength is comprised of a substrate having first and second surfaces. A vacuum-deposited metal layer formed of a metal is carried by the first surface. A layer of semiconductor material is adhered to the metal layer and overlies the metal layer. The metal layer and the semiconductor layer have thicknesses which are selected to maximize absorption light interference of laser energy impinging on the same at the laser operating wavelength.

More in particular, a printing plate 11 incorporating the present invention is shown in FIG. 1 and consists of a substrate 12 having upper and lower or first and second surfaces 13 and 14. The substrate is typically formed of a suitable plastic material such as polyester or a polymer having a thickness ranging from 0.2 to 10 mils or a flexible metal substrate such as aluminum. The substrate 12 may be laminated to a thicker support member which preferably has a thickness of 5–12 mils. A metal layer 16 is vacuum deposited onto the first surface 13. The metal layer is deposited to a thickness ranging from 100 Å to 1000 Å and is formed of a metal from the periodic table. Such metals include, but are not limited to, titanium, chromium, nickel, hafnium and aluminum. When titanium is used, it preferably has a thickness ranging from 100 Å to 700 Å and, more preferably, a thickness of approximately 500 Å.

An elemental semiconductor layer 17 is vacuum deposited over the metal layer 16. The semiconductor layer also has a thickness range of 100–1000 Å. Examples of semiconductor material include silicon or germanium. Silicon is the preferable material. The semiconductor layer should have a high index of refraction in excess of 2.0 and preferably 3.0 or above.

The two layers 16 and 17 can be deposited in a roll coating process. Typically the metal film or layer 16 is deposited in a roll-to-roll vacuum coating machine directly onto the polyester substrate 11 followed by the semiconductor layer 17. In the desired embodiment, the coating layers 16 and 17 can be deposited serially one after the other in a single pass through a coating machine or alternatively in a double pass without breaking vacuum. Alternatively, the two layers can be deposited one after the other by passing a sheet from a roll of plastic substrate in one direction through the roll coater and depositing thereon the metal layer in one vacuum. Thereafter the semiconductor layer can be deposited on top of the metal layer in a separate, subsequent vacuum in the same or different roll coater.

A layer 18 serving as a top coat is provided over the semiconductor layer 17 and has a thickness ranging from 0.5 to 4 micrometers. If an oleophobic top coat is desired, the coating can be formed of a silicone. Alternatively, if a hydrophilic coating is desired, it can be formed of a suitable material such as a polyvinyl alcohol.

The substrate 12 with the multi-layer coating thereon can be supplied as a product with the substrate having a thickness ranging from 0.5 to 4.0 mils and in which the substrate is secured to a separate support member 19 by suitable means such as an adhesive 20 so that a dimensionally stable printing plate 11 is provided. The support member 19 can be formed of a suitable material such as plastic or metal.

Another embodiment of a printing plate incorporating the present invention is shown in FIG. 2, which eliminates the need for lamination. The printing plate 26 shown in FIG. 2 consists of a flexible metal substrate 27 and suitable material such as aluminum of a suitable thickness of 5–12 mils and having a surface 28. A polymeric dielectric 29 is provided on the surface 28 to a thickness of 0.25 to 2.0 mils. This layer 29 can be an evaporative layer of PET and is provided to mimic the function of the substrate 11 in the embodiment shown in FIG. 1. The layer 29 is followed by a metal layer 36, a semiconductor layer 32 and a top coat layer 33 as in the embodiment shown in FIG. 1.

The improved optical performance which can be achieved with the printing plate or members 11 and 26 of the present invention is shown in FIG. 4 in which the metal layer 16 is a layer of chromium having a thickness of 600 Å and the semiconductor layer 17 is a layer of silicon having a thickness of 650 Å. The layers 16 and 17 are of thicknesses to provide light interference effects. The absorptance curve in FIG. 4 represents the calculated absorption (A) from 400 nanometers to 1,000 nanometers whereas the reflectance (R) and transmittance (T) curves show the measured average reflectance and the measured average transmission over the same wavelength range. The absorption was determined with the well-known equation A=100%-R-T. As shown, absorption by interference effects is high in the near infrared spectral region where the laser operates. This permits efficient use of the incident radiation from the diode laser, increasing the tolerances which can be accommodated in the printing press in which the printing plate is mounted while maintaining an effective operating range of laser power density over which the plate material will ablate without degradation of the image produced. This improved operating tolerance has been confirmed by measurements which show a 25–50% sensitivity improvement over a single layer of titanium or metal and generally at least approximately 40%.

As can be seen in FIG. 3, where a single layer of titanium has been optimized for maximum absorption in the infrared spectral region, the absorption maximum is approximately 40%, whereas the improved laser imageable thin film structure of the present invention has an absorption in the infrared spectral region where the laser operates of approximately 90+% as can be seen from FIG. 4.

From the foregoing, it can be seen the present invention makes it possible to increase the operating tolerances in printing presses by improving the sensitivity of the laser absorbing plate material itself. The combination of the metal and semiconductor layers induces significantly increased absorption of the near infrared laser radiation from the diode laser to substantially increase the operating tolerances which can be accommodated by the thin film structure incorporating the present invention without degradation of the image produced.

What is claimed:

1. A lithographic laser imageable film structure comprising a substrate having first and second surfaces, a vacuum-deposited metal layer carried by the first surface of the substrate, a layer of elemental semiconductor material adherent to said metal layer and overlying the metal layer, said metal layer and said elemental semiconductor material having thicknesses which are selected to maximize absorption by light interference of laser energy impinging on the same, said layer of elemental semiconductor material having a thickness ranging from 100 Å to 1,000 Å.

2. A structure as in claim 1 wherein said substrate is a barium sulfate filled polymer sheet.

3. A structure as in claim 1 wherein said metal layer has a thickness ranging from 100–1000 Å.

4. A substrate as in claim 1 wherein said metal layer is selected from the group of titanium, chromium, nickel, hafnium and aluminum.

5. A structure as in claim 4 wherein said metal layer is titanium having a thickness ranging from 500–700 Å.

6. A structure as in claim 1 wherein said semiconductor material is selected from the group of silicon and germanium.

7. A structure as in claim 6 wherein said semiconductor material is silicon.

8. A structure as in claim 1 together with an organic layer overlying said layer of semiconductor material.

9. A structure as in claim 7 wherein said organic layer is formed of an oleophobic material.

10. A structure as in claim 9 wherein said oleophobic material is silicone.

11. A structure as in claim 8 wherein said organic layer is formed of a hydrophilic material.

12. A structure as in claim 11 wherein said hydrophilic material is polyvinyl alcohol.

13. A structure as in claim 1 wherein said substrate has a thickness ranging from 0.2–10 mils.

14. A structure as in claim 13 together with a support member having a surface and an adhesive securing the second surface of the substrate to the surface of the support member to provide a printing plate.

15. A structure as in claim 1 wherein said substrate has a thickness in excess of 6 mils.

16. A printing plate comprising a support member having a surface, a flexible substrate having first and second surfaces, an adhesive securing the second surface of the substrate to the surface of the support member, a vacuum deposited metal layer carried by the first surface of the substrate and a layer of elemental semiconductor material adherent to said metal layer and overlying the metal layer, said metal layer and said layer of elemental semiconductor material having thicknesses which are selected to maximize absorption by light interference of laser energy impinging on the same, said layer of elemental semiconductor material having a thickness ranging from 100 Å to 1,000 Å.

17. A printing plate as in claim 16 together with a topcoat layer overlying the semiconductor layer.

18. A printing plate comprising a flexible metal substrate having a surface, a polymeric layer formed on said surface, a vacuum-deposited metal layer carried by the polymeric layer and a layer of elemental semiconductor material adherent to said metal layer and overlying the metal layer, said metal layer and said layer of elemental semiconductor material having thicknesses which are selected to maximize absorption by light interference of laser energy impinging on the same, said layer of elemental semiconductor material having a thickness ranging from 100 Å to 1,000 Å.

19. A printing plate as in claim 18 together with a topcoat overlying the layer of semiconductor material.

* * * * *